July 10, 1962  J. J. DI NUNZIO  3,042,948
OUTSOLE AND METHOD OF MANUFACTURE
Filed June 28, 1960
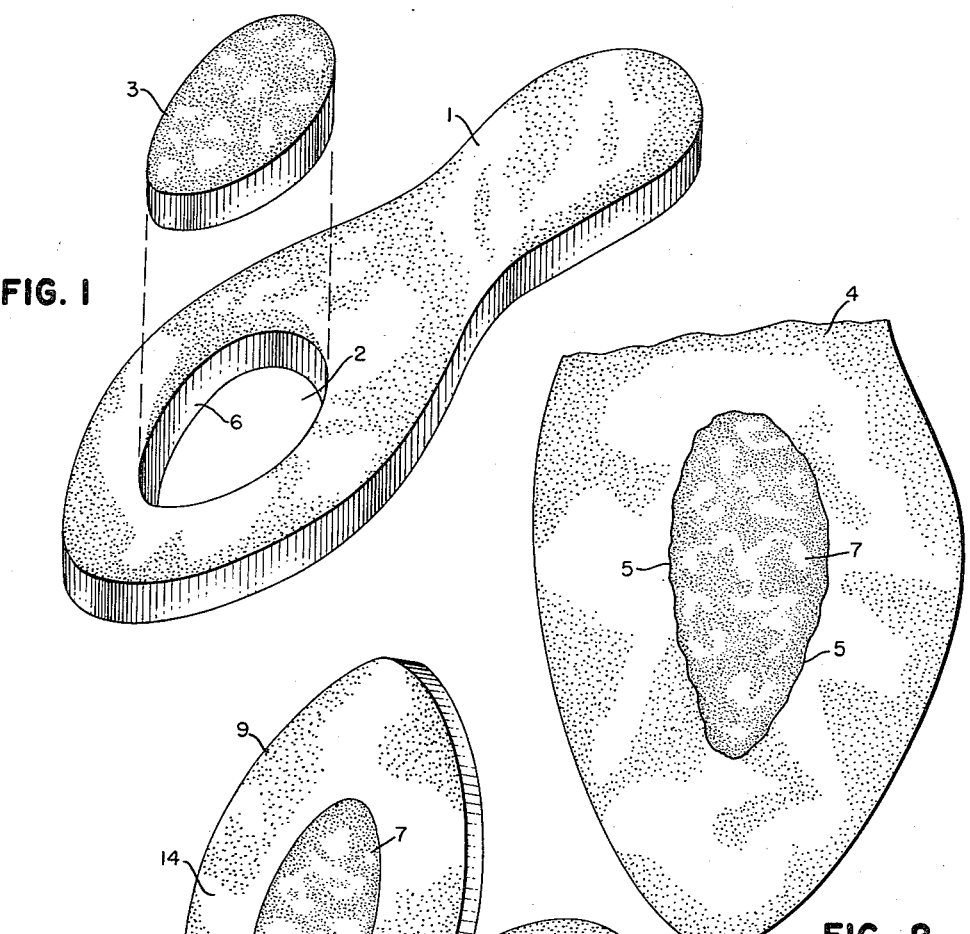
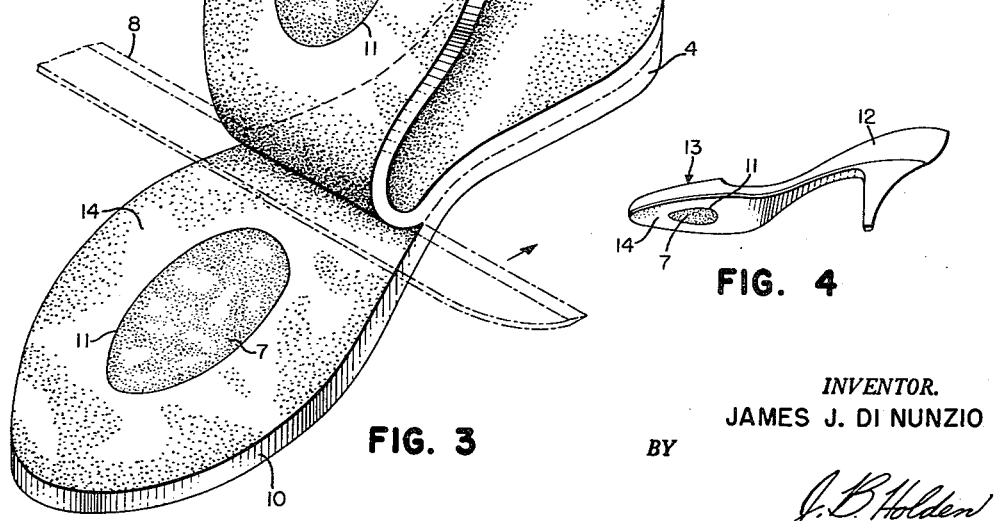
INVENTOR.
JAMES J. DI NUNZIO
BY
J. B. Holden
ATTORNEY

United States Patent Office 3,042,948
Patented July 10, 1962

3,042,948
OUTSOLE AND METHOD OF MANUFACTURE
James J. Di Nunzio, Windsor, Vt., assignor to The Goodyear Tire & Rubber Company, Akron, Ohio, a corporation of Ohio
Filed June 28, 1960, Ser. No. 39,242
5 Claims. (Cl. 12—146)

This invention relates to the manufacture of an outsole having a patterned insert assembled with the outsole in such a way as to become a unitary part thereof and particularly to the method of assembling the insert with the outsole so that a clean, smooth and sharp juncture is formed between the insert and the outsole.

Outsoles containing a metatarsal cushioning insert made of a material softer than the outsole material is most desirable, especially for use in the manufacture of women's high heel shoes where the bulk of the weight of the body is concentrated in the metatarsal area of the foot. Also in the interest of style or eye-appeal a patterned insert of a contrasting color is most desirable. Many problems arise in attempting to provide such an insert in an outsole, particularly in regard to effectively securing the insert in place in an economical, facile, and efficient manner. Another problem involves producing a smooth, clean, and sharp juncture between the insert and the outsole which in turn will produce a smooth, clean, and sharp outline of the patterned insert.

It has now been discovered that all of these problems are solved by means of the method of the present invention where it is an object to produce a one-piece outsole having a cushioning and patterned insert in the metatarsal area thereof which is effectively secured against removal and which insert forms a smooth, clean, and sharp juncture with the surrounding outsole.

The foregoing and still further objects and advantages of this invention will become apparent from the study of the following specification taken in connection with the accompanying drawing wherein like characters of reference designate corresponding parts throughout the several views and wherein:

FIG. 1 is an exploded view in perspective showing an outsole having an opening in the metatarsal area into which an insert positioned above the opening is to be placed;

FIG. 2 is an enlarged view of the forward foot portion of the sole showing the uneven, distorted and unsymmetrical juncture between the insert and the outsole after the two parts have been secured together as by vulcanization;

FIG. 3 is a view in perspective showing the outsole of FIG. 2 being split into two equal parts to thereby generate two new outsole surfaces having a smooth, clean, and sharp juncture between the insert the outsole; and FIG. 4 is a view in perspective showing a lady's high heel shoe provided with an outsole of the present invention.

In practicing the improved method of making shoe soles as herein illustrated, and referring now to the drawing in detail, FIG. 1 shows a sole slug or blank 1 died-out as by means of a conventional clicker from a sheet of raw soling stock, not shown. The sheet is to be of a thickness greater than the desired thickness of an outsole so that at least two soles of either the same thickness or different thicknesses may be obtained by later splitting the prepared soling material into at least two outsoles. For example, a sheet of raw soling stock may be made by calendering a desired soling material into sheets 14 inches by 36 inches and having a thickness or gauge of 0.290 inch. The sole slug 1 is then died-out to substantially the exact contour of a mold in which the lug will be cured as is the case when a vulcanizable soling material is used.

At the time the sole slug is clicked out, an oval cutout 2 may be simultaneously died-out or the oval cut-out 2 may be died-out in a subsequent operation.

Any soling material may be used and of particular value is soling material made of a homogeneous blend of a synthetic rubber such as a rubbery copolymer of a conjugated diene, i.e., butadiene-1,3, and a vinyl aromatic monomer, i.e. styrene, and a rubber-reinforcing resin such as a resinous copolymer of the same monomers used in making the rubbery copolymer mentioned above but using larger amounts of the vinyl aromatic monomer than are used in making the rubbery copolymer and compounding the blend with conventional curing agents, fillers, antioxidants, coloring agents, and the like as disclosed, for example, in Borders United States Patent 2,638,462 and in Gates United States Patent 2,638,457.

The insert 3 is also made of a soling material similar to the soling material used in making the sole slug 1 but compounded to produce a softer cushioning effect when cured than is produced by the cured sole slug material. For example, the same rubbery copolymer used for the soling stock may be used for the insert but without the addition thereto of the reinforcing resin. The insert 3 is died-out by means of a conventional clicker from a sheet calendered to a size similar to the size of the sheet from which the sole slug 1 is obtained. It is most important to control the size of the insert to closely correspond to the size of the oval cut-out 2 so that the resulting outsole will have a uniform gauge and so that the insert will become securely bonded in the opening after being subjected to vulcanization.

The sole insert 3 is then placed in the opening 2 and the assembled sole slug placed in a standard split sole mold which is then placed in a standard press where heat and pressure are applied to the mold for a time sufficient to cure the insert and outsole material into a one-piece outsole 4 shown in FIG. 2.

Regardless of the care taken to carefully control the size of the insert 3 it has been found that a ragged, distorted, and uneven juncture 5 always develops between the cured insert 7 and the wall edge 6 of the opening 2 on both the top and bottom sides of the cured sole 4. The juncture 5 may also be defined as being distorted, warped, twisted, deformed, malformed, unsymmetrical, or crooked in contrast to being uniform, homogeneous, consistent, regular, or unvaried. This unsightly and undesirable juncture line 5 still persists even when these surfaces are sanded to remove a substantial amount of the cured stock, which sanding is desirable in order to develop a proper walking surface.

However, in accordance with the present invention it has been discovered that when the cured sole slug 4 is split parallel to the surfaces of the slug as by means of a cutting instrument or knife 8 to thereby produce at least two outsoles 9 and 10 of the same or different thicknesses, the cured insert 7 meets the wall 6 on the cut or split side 14 to form a clean, smooth, and sharp juncture 11. The juncture 11 may also be defined as outlining a smooth, clean, and sharp pattern which is pleasing to the eye because the juncture truly reproduces the outline of the intended pattern, as for example the shape of the oval insert 3. The cured sole slug 4 may be trimmed and rough sanded on both sides before splitting. The outsoles 9 and 10 are then assembled with a shoe upper 12 as shown in FIG. 4 with the cut or split side 14 having the pattern defined by a smooth, clean, and sharp juncture turned outward to view and thus presenting a pleasing appearance to the potential purchaser of the completed shoe 13.

Thus, by means of the present invention a method has been discovered whereby a one-piece outsole may be made having an insert of one material integrally bonded into an outsole of another material in such a way as to form a uniform, regular, and sharp juncture between the two materials on the walking surface or split side of the outsole. In addition the integral insert 7 when made of a softer, more resilient material than the remaining portion of the outsole increases the flexibility of the sole when the sole is measured according to standard methods across the metatarsal area. The insert also improves the anti-slip properties of the shoe, not only because of the anti-slip properties of the material from which the insert is made but also because of the strategic location of the insert in the ball portion of the sole where most of the weight of the wearer of the shoe is concentrated. The insert also provides an improved feeling of comfort to the wearer because of the cushioning produced by the insert due to the greater resilience of the material of the insert that may be used in this restricted manner in a shoe sole while at the same time producing a proper support for the foot through the use of a less resilient material in the remainder of the sole.

The present invention also makes it possible to produce for the first time outsoles having on the walking surfaces thereof a sharp, consistent, and clean line of juncture outlining patterned inserts integrally bonded therewith in a precise and sharp manner and which outsoles are mirror images of each other forming perfectly matched right and left hand outsoles which may be used in making a pair of shoes having perfectly matched outsoles with patterned inserts.

Any shape of insert may be used in this invention including the well known geometric shapes such as triangles, squares, stars, rhomboids, parallelograms, crosses, and the like as well as curved shapes including circles, parabolas, half moons, various heart shapes, tear drop shapes, and any other symbol or insignia that might be desired to insert in the outsole of a shoe where it is necessary to insure a clean, smooth, and sharp outline of the insert for reasons stated above.

While certain representative embodiments and details have been shown for the purpose of illustrating the invention, it will be apparent to those skilled in this art that various changes and modifications may be made therein without departing from the spirit or scope of the invention.

What is claimed is:

1. A method of making an outsole which comprises forming an outsole blank of one material of a thickness greater than the thickness of at least two outsoles and having an insert of another material positioned to extend from one face of said blank to the opposite face, securing said insert and outsole blank into bonded relationship with each other and then splitting the bonded outsole blank and insert parallel to at least one face and through said insert to form at least two outsoles of desired thickness, each having on the split side a clean, smooth, and sharp juncture between said materials.

2. A method of making an outsole which comprises forming an outsole blank of one material at least twice as thick as the desired thickness of an outsole and having an insert of another material positioned to extend from one face of said blank to the opposite face, securing said insert and outsole blank into bonded relationship with each other and then splitting the bonded outsole blank and insert parallel to at least one face and through said insert to form at least two outsoles of desired thickness, each having on the split side a clean, smooth, and sharp juncture between said materials.

3. A method of making an outsole which comprises forming an outsole blank of one material of a thickness greater than the desired thickness of an outsole, removing a portion of said material in the form of a desired pattern from said blank to produce a corresponding opening in said blank, substantially filling said opening with another material, securing said materials into bonded relationship with each other and then splitting from said blank parallel to at least one face and through said insert to form at least two outsoles of desired thickness, each having on the split side the desired pattern defined by a clean, smooth, and sharp juncture between said materials.

4. A method of making an outsole which comprises forming an outsole blank of a vulcanizable material of a thickness greater than the desired thickness of at least two outsoles and having an insert of a material which is softer than said outsole blank material when in a vulcanized condition positioned to extend from one face of said blank to the opposite face, securing said insert and outsole blank into bonded relationship with each other by means of heat and pressure to effect the vulcanization of said materials, and then splitting the bonded outsole blank and insert parallel to at least one face and through said insert to form at least two outsoles of desired thickness, each having on the split side a clean, smooth, and sharp juncture between said insert and the remaining portion of said outsole.

5. A method of making an outsole which comprises forming an outsole blank of a vulcanizable diene rubbery polymer of a thickness greater than the desired thickness of an outsole, removing an oval-shaped portion of the rubbery material from said blank to produce an oval-shaped opening therein, filling said opening with a similar rubbery polymer which is softer than said blank material when both are in a vulcanized condition, vulcanizing said materials into bonded relationship with each other, and then splitting from said vulcanized blank parallel to at least one face and through said insert to form an outsole of desired thickness having on the split side a clean, smooth, and sharp juncture between the inserted material and the remaining portion of the outsole.

References Cited in the file of this patent

UNITED STATES PATENTS

| | | |
|---|---|---|
| 1,592,445 | Cutler | July 13, 1926 |
| 1,763,148 | Gusdorf | June 10, 1930 |
| 1,959,382 | Newton | May 22, 1934 |
| 1,978,030 | Ritchie | Oct. 23, 1934 |
| 1,988,281 | Maccarone | Jan. 15, 1935 |
| 2,084,884 | Azzara et al. | June 22, 1937 |
| 2,126,601 | Bain | Aug. 9, 1938 |
| 2,142,242 | Greenbaum | Jan. 3, 1939 |
| 2,268,709 | Kelly | Jan. 6, 1942 |